United States Patent Office 3,292,990
Patented Dec. 20, 1966

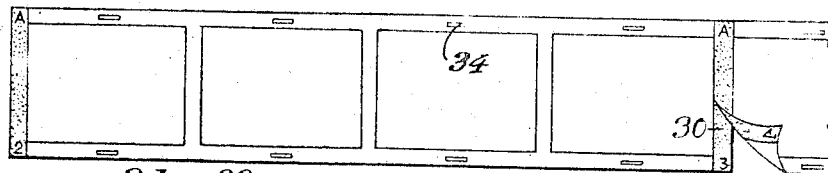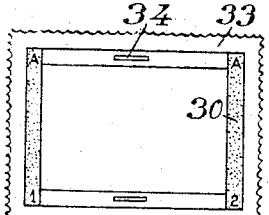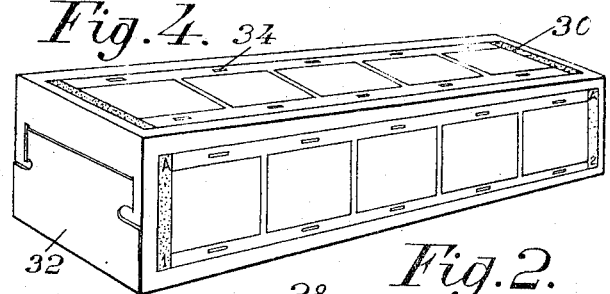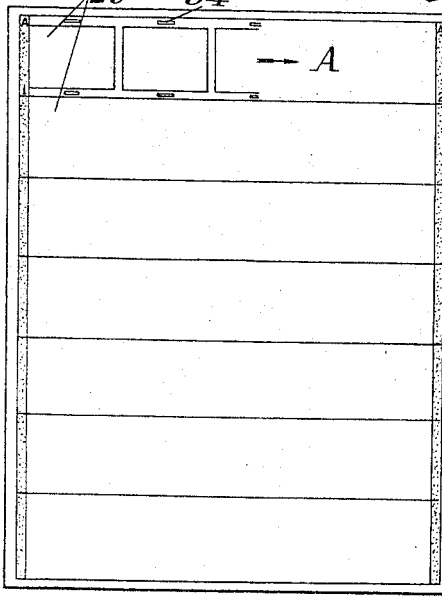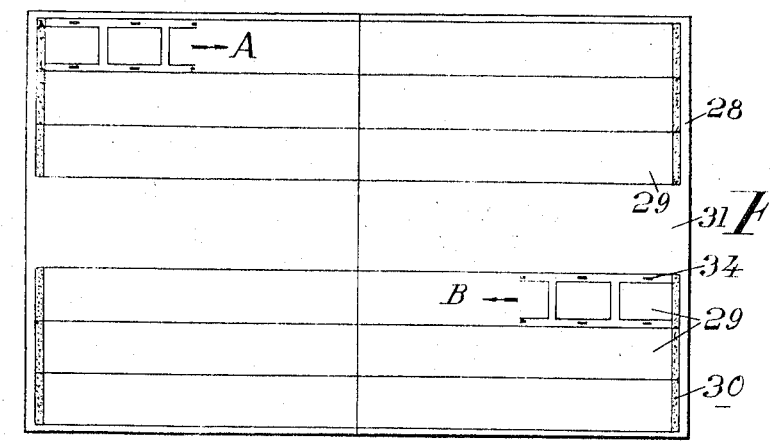

3,292,990
ARTICLE REMOVABLY MOUNTING A
PLURALITY OF FILM STRIPS
Jean de Montrémy, 8 Ave. des Tilleuls, and Jean Véran
Dejoux, 15 Rue de Castellane, both of Paris, France
Filed Nov. 30, 1964, Ser. No. 414,611
1 Claim. (Cl. 352—232)

The present invention relates to the production of motion pictures by means of a series of pictures carried by one or two continuous bands, the even numbered pictures and the odd numbered pictures being projected through two distinct projection channels and every projected picture being gradually replaced by the next one in the series by superposition according to a special application of the well-known "dissolving" technique.

According to this application, every projected image is gradually superposed on the preceding one by gradual reduction of the luminous intensity of the first image and gradual increase of the luminous intensity of the second image, the illumination of every projected image becoming minimum and preferably zero at the time when the luminous intensity of the next image becomes maximum, and every image of a given order (that is to say either even numbered or odd numbered) being suddenly replaced by the next image of the same order at the time when its illumination has become minimum.

The present invention concerns more particularly the supports of these pictures, or frames, and their connection side-by-side or end-to-end to form the band or bands discussed above.

It is a principal object of this invention to place the means for showing motion pictures produced according to this specialized "dissolving" technique within the reach of a large portion of the public, and particularly within the reach of children, by making such series of frames readily available, either in the form of entire bands or, preferably, in the form of a plurality of segments which must be joined together to make the finished band.

It is intended to accomplish this object by reproducing at least some of these frames upon supports which are readily available to the public and preferably to children, particularly on special pages of newspapers or magazines (e.g. comic books) or on the packages for widely sold articles, each support containing one or several pictures and an adhesive strip protected by a non-adhesive flap (or a non-adhesive strip easy to render adhesive) being provided along the edge of each frame or group of frames to permit the facile assemblage of a complete band.

These and other objects, features and advantages of this invention will become more readily apparent from the following detailed description when taken together with the attached drawings, in which:

FIGS. 1 and 2 each show two pages of a magazine serving as supports for sections of a band of images according to the invention;

FIG. 3 shows the joining together of two such sections;

FIG. 4 shows a box for noodles whose sides carry groups of frames according to the invention; and FIG. 5 shows a single frame mounted in such a way as to be readily distributable and attachable to other such elements in conformance with this invention.

Before entering into a discussion of the present invention, it should be noted that it has already been suggested to project onto a screen two series of fixed pictures, every image of one series gradually replacing, on the screen, the preceding image of the other series, to which it is superposed, by gradually increasing the luminous intensity of said second mentioned image as the luminosity of the first image is reduced. When the luminosity of this first image becomes zero (at a time which corresponds to the maximum luminosity of the second image) said first image is automatically replaced, ahead of the projecting lens, by the next image of its series, which in turn replaces it and so on.

In a prior patent application Ser. No. 152,214 filed by Jean de Montrémy and Jean-Véran Dejoux on November 14, 1961 for "Methods and Apparatus for Making Animated Cartoons" and the continuation-in-part Ser. No. 362,415 filed by Jean de Montrémy and Jean-Véran Dejoux on April 24, 1964 for "Methods and Apparatus for Making Animated Cartoons," the consecutive pictures of the series are the successive pictures of an animated cartoon to be reproduced, every projection being separated from the preceding one by a time interval of $1/n$ second. The images thus obtained were caused to succeed one another in their respective projection channels at the rate of a total number of pictures (of both orders) equal to $n$ per second, the gradual increase and decrease of every image thus projected being ensured in a uniform manner over the whole area thereof. Owing to this feature, it is possible to give $n$ a value lower than 10 without imparting the illusion of continuity given by the successive pictures formed on the retinas of the observers, which greatly simplifies the work of the draftsman making the elementary pictures of the series (this work being for example divided by 4 in the case where $n$ is equal to 6, with respect to the classic rate 24 frames per second).

Such a substantial simplification permits the frames to be carried on supports other than those initially in the form of long continuous strips; they may be carried, rather, on a plurality of supports each of which comprises one or a small plurality of frames and means for permitting a plurality of these supports to be easily joined together to form the complete series of frames required for the projection of a motion picture.

In accordance with the present invention, it has been imagined to use as supports for each small plurality of frames various articles which enjoy a wide distribution and which have uses other than the creation of motion pictures, uses such as packaging, publicity, or the dissemination of information.

Thus groups of frames as described above are placed on supports which have a wide distribution and can be eventually joined together to form complete bands, which operation should prove especially attractive to children.

The small groups of frames can be transparent or opaque and can be made from any desirable material (particularly of paper or plastic) and should be made flexible enough to permit the band to be wound in a roll.

Several non-limitative examples of the form which such supports may take are shown in the figures, each of which is a pictorial view of an embodiment of this present invention.

In FIGS. 1 and 2 the support is represented by the central double page 28 of a children's periodical (comic book). Such an arrangement permits the series of frames to be sold in the form of chapters of a serial.

Each of these double pages comprises a certain number of strip segments 29 some of which (designated for example by A) carry the odd-numbered frames of the series, and the others of which (designated by B) carry the even-numbered frames, the succession of the latter group being in the inverse direction from that of the former group, as indicated by the arrows, for the case where the projection of the frames of one group requires one more reflection than does the projection of the frames of the other group, as is described in the above-cited patent applications.

Each segment 29 is advantageously bordered along at least one of its edges by a layer of adhesive 30 which is preferably protected by a removable, non-adherent protective strip, or flap, for example of cellophane, prior to the joining together of the segments. Alternatively, said layer may be not adhesive by itself, being rendered adhesive only by certain conditions such as humidity, heat, pressure, irradiation, and so on.

In order to construct complete strips from these segments, it is sufficient, in following instructions which may be printed in the space 31 indicated in FIG. 1, to cut the segments out along their borders (or, alternatively, to tear them out along suitably arranged perforations), to detach the protective strips from adhesive layers 30, and to join successive segments together by placing the layer 30 of one segment against that of the adjacent segment, as is shown in FIG. 3, and by creating whatever condition is necessary to produce adhesion (e.g. applying pressure, heat, water, etc.).

An analogous support could be constituted equally well by the pages (single or double) of a book.

The support shown in FIG. 4 is the form of a rectangular box 32 serving as a package for a food item, such as spaghetti, each longitudinal face of the box carrying a segment 29 of several frames similar to the segments described above.

In FIG. 5 there is shown a coupon-like support 33 carrying a single frame destined to complete a series constructed from segments such as those shown in the preceding figures, or to be glued to a plurality of similar coupon-like supports.

Such coupons could be given out individually or in groups as rewards to children or as advertising coupons or premiums for encouraging the buying of consumer products.

It may be seen from these figures that each frame can be bordered by one or several guide slots 34 whose number, form, dimensions and positioning are determined exclusively by the characteristics of the device intended to use the film strips to show motion pictures.

If desired, the pictures could intentionally be left incomplete so that children may complete them by coloring, decalcomania, tracing, etc., or they can make the pictures starting from blank frames.

According to one particularly interesting variation, the cartoons created could have an educational purpose. It should also be appreciated that the pictures could be photographic images reproduced on the strips by any suitable means.

Regardless of which of the above-described variations is employed, the net result is the distribution of motion picture films having a low cost, a wide market which will be composed mostly of children, and the capability of being easily assembled.

While several embodiments of the present invention have been shown and described herein, it should be appreciated that many variations would occur to one skilled in the art without departing from the spirit thereof and that therefore the scope of this invention should be limited only by the breadth of the appended claim.

What we claim is:

In combination with an article having a sheet associated therewith, a first plurality of strips of film removably secured to said sheet, a second plurality of film strips removably secured to said sheet adjacent said first plurality of film strips, each of said film strips in said first plurality consisting of adjacent frames constituting the odd number frames of sequentially exposed motion picture film, each of said film strips of said second plurality consisting of adjacent frames constituting the even number frames of sequentially exposed motion picture film, each of said film strips in each of said first and second pluralities being provided with an adhesive segment at the terminal portions of said strip enabling joinder of the strips in said first plurality into a continuous film strip, and enabling the joinder of the strips in said second plurality into a second film strip.

References Cited by the Examiner

UNITED STATES PATENTS 2,091,260  8/1937  Farkas et al.
2,256,399  9/1941  Mac Harg _____ 88—26 X
2,931,557  4/1960  Loderhose _____ 206—47 X

FOREIGN PATENTS 74,655   12/1958  France.
182,086   3/1923  Great Britain.
292,711   6/1928  Great Britain.

NORTON ANSHER, *Primary Examiner.*

VANCE A. SMITH, *Assistant Examiner.*